Patented May 30, 1950

2,509,204

UNITED STATES PATENT OFFICE 2,509,204

CATALYTIC CONVERSION

Julius P. Bilisoly, Baton Rouge, La., assignor to Standard Oil Development Company, a corporation of Delaware No Drawing. Application February 18, 1946, Serial No. 648,555

4 Claims. (Cl. 260—449.6)

This invention relates to the catalytic conversion of carbon oxides with hydrogen to form valuable synthetic products. More specifically, the invention is concerned with improved catalysts and methods of operation for the catalytic synthesis of normally liquid hydrocarbons and oxygenated compounds from CO and $H_2$.

The conventional hydrocarbon synthesis processes may be divided into two broad classes, depending on the type of catalyst used and the character of reaction products obtained. One class comprises reactions using catalysts of which cobalt is a typical representative, at relatively low temperatures of about 350°–450° F. and relatively low pressures of about 1–10 atm. abs., to form predominantly saturated paraffinic liquid and solid hydrocarbons from which highly valuable Diesel fuels and wax may be obtained. The other class of processes employs iron type catalysts at higher temperatures of about 450°–800° F. and higher pressures of about 3–100 atm. abs. to obtain a predominantly unsaturated product from which highly valuable motor fuels having satisfactory octane ratings may be recovered. Space velocities in both classes are about 1–200 v./v./hr. in fixed bed operation and about 500–2000 v./v./hr. in fluid operation.

Active synthesis catalysts are usually prepared by the reduction of the oxides of the active metal component obtained by alkaline precipitation, oxidation, or dissociation of suitable metal compounds. It is known that the catalytic activity of these metal components may be considerably enhanced by the addition of small amounts of about 0.5–10% of various promoters. Thus, cobalt type catalysts have been promoted mainly by the addition of oxides of magnesium, thorium and other rare earth metals, while compounds of alkali metals, particularly of potassium, are known to be the most active promoters for iron type catalysts. It has also been suggested to deposit synthesis catalysts, particularly those of the cobalt type, on inert or active carriers such as siliceous materials, particularly kieselguhr, pumice, synthetic silica gel and various clays, hydrated alumina, magnesium carbonate, etc.

All these prior art synthesis catalysts must be used either at high or low temperatures and pressures, depending on whether they are of the iron or cobalt type. The production of motor fuels of satisfactory octane rating requires the presence of iron type catalysts and the use of expensive equipment capable of resisting the high temperatures and pressures of the iron type synthesis reaction. This situation has stimulated extensive research to develop a new type of synthesis catalyst permitting the production of valuable motor fuels at relatively low pressures and temperatures. The present invention includes such new development.

It is, therefore, a principal object of my invention to provide an improved process for synthesizing valuable products from hydrogen and oxides of carbon in the presence of an improved synthesis catalyst.

Another object of my invention has to do with an improved hydrocarbon synthesis carried out in the presence of an improved supported catalyst.

A further object of my invention is to provide improved supported synthesis catalysts for the conversion of CO with $H_2$.

A more specific object of my invention is to provide an improved supported catalyst for the synthesis of valuable motor fuels from CO and $H_2$ at relatively low temperatures and pressures.

Other and further objects and advantages will appear hereinafter.

I have found that these objects may be accomplished quite generally by carrying out the synthesis reaction in the presence of one and preferably at least two metal components, preferably of the iron group, supported on a base or carrier comprising at least a major proportion of magnesium oxide. More specifically, I have found that satisfactory yields of valuable motor fuels are obtained when CO and $H_2$ are reacted at relatively low temperatures of about 400°–450° F., preferably at a temperature which is intermediate those generally employed for supported cobalt and supported iron catalysts, for example about 415° F., and low pressures of about 1–10 atm. abs., preferably atmospheric pressure, in the presence of a catalyst containing cobalt, preferably together with iron, on a magnesia base carrier material. Other active components such as Ni, Mo, Th, etc., may be used in combination with cobalt and iron. The addition of a promoter and a stabilizer enhances the activity of the catalysts. Preferred promoters are those obtained by the addition, to the original catalyst composite, of compounds of potassium such as KOH, $K_2CO_3$, $KNO_3$, KCl, etc. Similar compounds of other alkalies such as Na and Li, or of Ba and Ca, and oxides of other metals may be added as promoters. Useful stabilizers may be derived from the oxides of metals of the right hand side (transition series) of groups I, II and III of the periodic system or certain non-acidic oxides. CuO has been found to be particularly suitable for this purpose. The principal function of the promoter is to increase catalytic activity while the stabilizer is added to prevent deactivation of the catalyst.

In general, my catalysts contain about 20-60 parts by weight of the active component, i. e. iron+cobalt (calculated as metals), and about 40-80 parts by weight of magnesia, while promoter and stabilizer may be added in amounts varying between about 0.5-10 parts by weight and 1-20 parts by weight, respectively. Good results have been obtained with catalysts prepared by incorporating about 20-40 parts by weight of cobalt calculated as metal (or 25-51 parts by weight calculated as cobalt oxide) into such magnesia-base iron oxide catalysts promoted with potassium and stabilized with copper as have been used in the dehydrogenation of olefins in the presence of steam as disclosed in the Kearby Patent No. 2,395,875, issued March 5, 1946, on application Ser. No. 430,873, filed February 14, 1942, i. e. into catalysts which prior to use have a composition about as follows:

| | Parts by weight |
|---|---|
| MgO | 50-95 |
| $Fe_2O_3$ | 3-49 |
| $K_2O$ | 0.5-10 |
| CuO | 0.5-20 |

The overall range of the magnesia content of the catalyst may run from 40-95 parts by weight. Dehydrogenation catalysts of this type may be prepared by adding a mixed solution of iron and copper sulfates to be an excess of magnesia suspended in water. Continued mixing effects the precipitation of the iron and copper. The entire precipitate may be filtered, washed and pressed, reslurried with an aqueous solution of a potassium carbonate, dried while mixing and finally heat-treated at 1200° F.

My catalysts may be prepared by various methods, such as mixing the freshly precipitated hydroxides of the active metal components with the magnesia base, impregnation of the magnesia base with a salt of the metal component decomposable by heat, suspending the magnesia base in a salt solution of the metal component followed by precipitation with an alkali carbonate, milling the magnesia base with the dry metal component, etc.

A typical method suitable for preparing a catalyst useful in my process is as follows: 424 g. of $Co(NO_3)_2.6H_2O$ is diluted to a volume of 2150 cc. so as to contain 40 g. of Co per liter. Another solution is prepared by dissolving the equivalent of 173 g. of $Na_2CO_3$ in water to a volume of 1730 cc. containing 100 g. of $Na_2CO_3$ per liter. Both solutions are heated to boiling and the cobalt nitrate solution is added within about one minute to the sodium carbonate solution while stirring to precipitate cobalt carbonate. The mixture thus obtained is combined with used steam-butene dehydrogenation catalyst as follows. The steam butene dehydrogenating catalyst employed has the following analysis before use:

| | Parts by weight |
|---|---|
| MgO | 78.5 |
| $Fe_2O_3$ | 20.0 |
| CuO | 5.0 |
| $K_2O$ | 5.0 |

This used catalyst is heated in air at 1200° F. to burn off residual carbon and it is pulverized so its particle size range is as follows:

| | Per cent |
|---|---|
| 0-20 microns | 39.4 |
| 20-40 microns | 24.7 |
| 40-80 microns | 18.2 |
| 80+ microns | 17.7 |

About 200 grams of this material is mixed into the solution containing the precipitated carbonate. The composition of the used dehydrogenation catalyst is substantially the same as that of the fresh dehydrogenation catalysts, though under certain dehydrogenation conditions the $K_2O$ content may be reduced to about 0.5-1 part by weight without affecting the utility of the catalyst for the purposes of my invention. After addition of the dehydrogenation catalyst to the mixed solution, stirring is continued for about one minute, the material is filtered, washed free of $Na_2CO_3$ and dried at 212° F. This composite is preferably reduced for four hours at 700° F. with $H_2$ having a velocity of 1200 meters per hour. The catalyst has about the following composition prior to reduction.

| | Parts by weight |
|---|---|
| MgO | 78.5 |
| CoO | 38 |
| $Fe_2O_3$ | 20 |
| CuO | 5 |
| $K_2O$ | 5 |

When a synthesis gas containing 2 volumes of $H_2$ per volume of CO is contacted at atmospheric pressure, a temperature of about 415° F. and a space velocity of about 100 v./v./hr. with the catalyst obtained by the method of preparation described above a liquid yield of about 104 cc. of valuable motor fuel per cubic meter of synthesis gas supplied may be recovered.

The present invention is not to be limited to any theory of the mechanism of the process or catalysts nor to any examples given merely for illustrative purposes, but only by the following claims in which I wish to claim all novelty inherent in the invention.

I claim:
1. An improved reduced catalyst for the catalytic conversion of Co and $H_2$, the analysis of which on an oxide basis is essentially 78.5 parts by weight of MgO, 38 parts by weight of CoO, 20 parts by weight of $Fe_2O_3$, 5 parts by weight of CuO and 0.5-5 parts by weight of $K_2O$.

2. An improved reduced catalyst for the catalytic conversion of CO and $H_2$ which essentially consists of a composite the analysis of which on an oxide basis is essentially 40-95 parts by weight of MgO, 3-50 parts by weight of $Fe_2O_3$, 0.5-20 parts by weight of CuO, 0.5-10 parts by weight of $K_2O$ and 25-51 parts by weight of CoO.

3. An improved process for producing valuable motor fuels from CO and $H_2$ by a catalytic synthesis reaction, which comprises contacting a gas containing CO and $H_2$ in synthesis proportions at temperatures of about 400°-450° F., pressures not substantially above atmospheric and synthesis space velocities with a catalyst which essentially consists of a composite the analysis of which on an oxide basis is essentially 40-95 parts by weight of MgO, 3-50 parts by weight of $Fe_2O_3$, 0.5-20 parts by weight of CuO, 0.5-10 parts by weight of $K_2O$ and 25-51 parts by weight of CoO.

4. An improved process for producing valuble motor fuels from CO and $H_2$ by a catalytic synthesis reaction, which comprises contacting a gas containing CO and $H_2$ in synthesis proportions at temperatures of about 400°-450° F., pressures not substantially above atmospheric and synthesis space velocities with a catalyst, the analysis of which on an oxide basis is essentially 78.5 parts by weight of MgO, 38 parts by weight of CoO, 20 parts by weight of $Fe_2O_3$, 5 parts by weight of CuO and 0.5-5 parts by weight of $K_2O$.

JULIUS P. BILISOLY.

REFERENCES CITED

The following references are of record in the file of this patent:

UNITED STATES PATENTS

| Number | Name | Date |
|---|---|---|
| 1,609,593 | Woodruff et al. | Dec. 7, 1926 |
| 1,772,652 | White | Aug. 12, 1930 |
| 1,801,382 | Wietzel et al. | Apr. 21, 1931 |
| 2,106,597 | Ferguson | Jan. 28, 1938 |
| 2,253,607 | Boyd et al. | Aug. 26, 1941 |
| 2,318,626 | Pier et al. | May 11, 1943 |
| 2,369,106 | Heckel et al. | Feb. 6, 1945 |
| 2,370,797 | Kearby | Mar. 6, 1945 |
| 2,395,875 | Kearby | Mar. 5, 1946 |
| 2,417,164 | Huber, Jr. | Mar. 11, 1947 |

OTHER REFERENCES

Berkman et al.: Catalysis, Reinbold Publishing Co., 1940, page 710.